J. H. J. HAINES.
TELEGRAPHONE.
APPLICATION FILED FEB. 3, 1910.
1,079,123.
Patented Nov. 18, 1913.
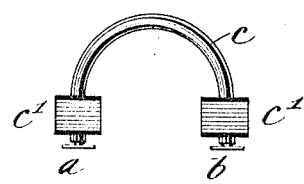
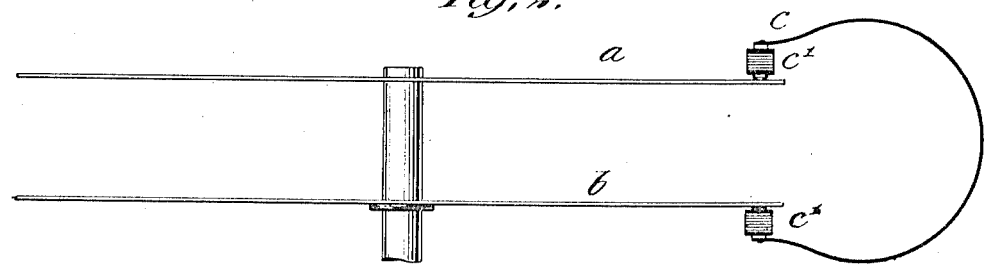
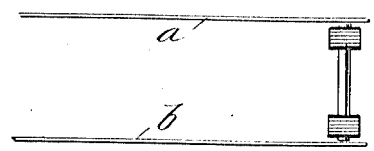

UNITED STATES PATENT OFFICE.

JOHN H. J. HAINES, OF NEW YORK, N. Y.

TELEGRAPHONE.

1,079,123.  Specification of Letters Patent.  Patented Nov. 18, 1913.

Application filed February 3, 1910. Serial No. 541,773.

*To all whom it may concern:*

Be it known that I, JOHN H. J. HAINES, a citizen of the United States, residing at the city of New York, in the borough of Manhattan and State of New York, have invented certain new and useful Improvements in Telegraphones, of which the following is a full, clear, and exact description.

This invention relates to telegraphones and has special reference to the construction of the recording and reproducing magnet and the record surface coöperating therewith.

Heretofore in all forms of the telegraphone known to me, the electro-magnet through which the voice currents flow has a pole-piece or pole-pieces in contact with a single record surface or body; that is to say, if the magnet is a horseshoe magnet, having both of its poles operative in connection with the recording surface, said poles are in contact with different portions of a single strand of wire or of a single disk, the magnetic impression being left upon the wire or disk in the space between the two pole faces, and if the magnet is a single spool having only one pole in contact with the record surface, that pole leaves its impression at a single spot in said surface. My invention differs from these former constructions in that I use what is in effect a horseshoe magnet, although a modified form thereof, with one of its poles resting in contact with one steel body, being a wire, tape or disk, while the other pole is in contact with an entirely separate and distinct steel body, being also a wire, tape or disk. In this construction I have found that the record produced in the two recording bodies is much stronger than can be obtained with a single recording body and that the reproduction which is made with the same kind of an electro-magnet is correspondingly louder and clearer.

In the accompanying drawings my invention is illustrated conventionally.

Figure 1 is a view taken transverse to the length of the recording bodies, showing the electro-magnet in side elevation. Fig. 2 is a side view of two disks, showing the electro-magnet applied thereto in side elevation. Fig. 3 is a modification.

Referring to the drawing by letter, *a* and *b* respectively indicate two steel bodies, entirely independent of each other and running side by side at the same speed. As shown in Fig. 1 these bodies are in the form of flat tapes, for which may be substituted round wire. In Fig. 2 the steel bodies are indicated as disks. The motor for these steel bodies is of any approved construction which it is not necessary to show herein.

*c* indicates the electro-magnet which in general is of the horseshoe type. On each pole of the magnet is an electro-magnetic helix *c'* through which the voice currents are sent from a suitable transmitter and in which the reproducing currents are generated in the operation of reproducing. One pole of the magnet rests in contact with one of the steel bodies, while the other rests in contact with the other steel body, so that said bodies simultaneously receive and give out the same magnetic impression. My experiments have shown that with the steel recording body split up in this manner, the record is much stronger than where both poles of the magnet, or a single pole of the magnet, acts upon a single steel body. The reason for this phenomenon is not entirely apparent to me, but the results are undoubted.

In the form shown in Fig. 1, the magnetic surface is a stiff bar, while in the form shown in Fig. 2 it is largely composed of a flexible iron wire which may or may not be attached to a special pole-piece on which the magnet helix is located. The same results are also obtained by using the magnet in the form of a straight bar with a helix on each end, as shown in Fig. 3, in which case the two steel bodies would stand at right angles across the respective ends of the bar.

Having described my invention, I claim:

In a telegraphone, a recording medium of magnetizable material, said medium being in two separate and distinct recording parts, and means for simultaneously making substantially identical records upon both of said parts, said means including an electromagnet having a plurality of pole pieces, one of said pole pieces adapted to coöperate with one of said parts and the other of said pole pieces, with the other of said parts.

In witness whereof, I subscribe my signature, in the presence of two witnesses.

JOHN H. J. HAINES.

Witnesses:
WALDO M. CHAPIN,
WILLIAM C. LANG.